(12) United States Patent
Huang (10) Patent No.: US 7,334,301 B2
(45) Date of Patent: Feb. 26, 2008

(54) BUCKLE

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 11/456,876

(22) Filed: Jul. 12, 2006

(65) Prior Publication Data

US 2008/0010791 A1   Jan. 17, 2008

(51) Int. Cl.
*A44B 11/12* (2006.01)

(52) U.S. Cl. ............................................. 24/170

(58) Field of Classification Search .................. 24/170, 24/191, 193, 638, 646, 647, 650
See application file for complete search history.

(56) References Cited

U.S. PATENT DOCUMENTS 2,287,722 A * 6/1942 Beazley ..................... 24/170
3,678,542 A * 7/1972 Prete, Jr. .................... 24/191
2001/0022013 A1* 9/2001 Hsieh ......................... 24/170

* cited by examiner

*Primary Examiner*—James R. Brittain
(74) *Attorney, Agent, or Firm*—Alan Kamrath; Kamrath & Associates PA (57) ABSTRACT

A buckle includes a base made by pressing and formed with two walls, a cross member between the walls and a jaw between the walls. A jaw is made by rolling and formed with a cam, two non-circular blocks extending from the cam and two shafts extending from the non-circular blocks into an aperture defined in each of the walls of the base. A handle is made by pressing and formed with a touch portion and two non-circular braces for holding the non-circular blocks of the jaw. A handle is installed on the base so that a gap is defined between the jaw of the base and the jaw of the handle. The handle can be pivoted on the base between a first position where the gap is small and a second position where the gap is large. An elastic element tends to keep the handle in the first position.

10 Claims, 9 Drawing Sheets

BUCKLE

BACKGROUND OF INVENTION

1. Field of Invention

The present invention relates to a buckle and, more particularly, to a buckle that is manufactured with ease at a low cost.

2. Related Prior Art

Figure 1:
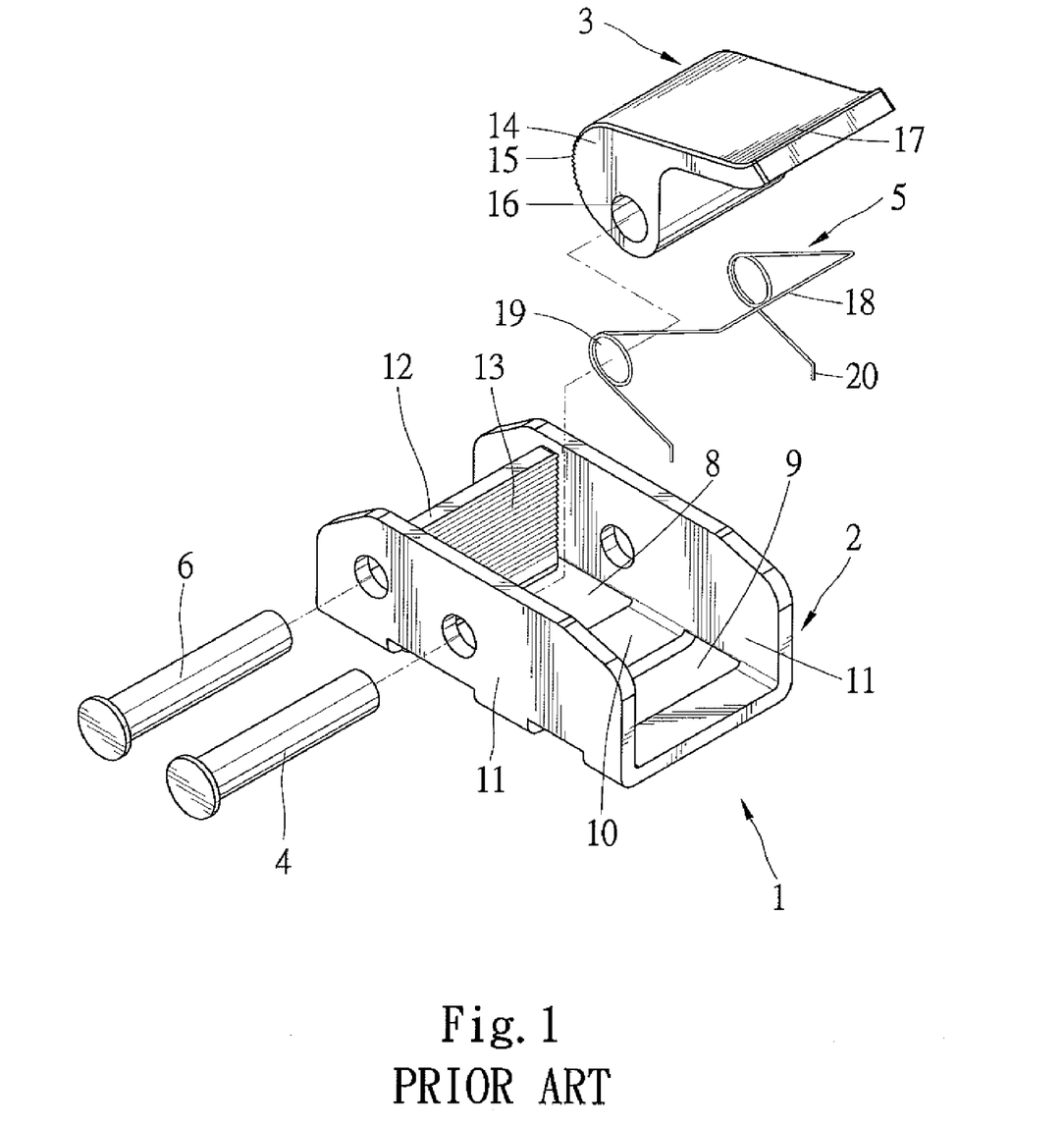
FIG. 1 is an exploded view of a conventional buckle.

Referring to FIG. 1, a conventional buckle 1 includes a handle 3 pivotally installed on a base 2. The base 2 includes two walls 11, a cross member 10 formed between the walls 11 and a jaw 12 formed between the walls 11. The jaw 12 is perpendicular to the cross member 10. The jaw 12 is formed with a plurality of teeth 13 on a side. A bar 6 is fit in an aperture defied in each of the walls 11 for supporting the jaw 12. The base 2 defines two openings 8 and 9 separated by the cross member 10.

The handle 3 includes a cam 14 and a touch portion 17 extending from the cam 14. The cam 14 is formed with a plurality of teeth 15. A tunnel 16 is defined in the cam 14.

An elastic element 5 includes a middle portion 18 and two lateral portions. Each of the lateral portions of the elastic element 5 includes a helical portion 19 and an end 20 extending from the helical portion 19. The end 20 of each of the lateral portions of the elastic element 5 may be in the form of a hook.

A shaft 4 is inserted in an aperture defined in each of the walls 11, the helical portions 19 of the elastic element 5 and the tunnel 16 of the cam 14 so that the base 2, the handle 3 and the elastic element 5 are joined. A gap is defined between the jaw 12 of the base 2 and the cam 14 of the handle 3. The ends 20 of the elastic element 5 are located against the cross member 10 of the base 2 while the middle portion 18 of the elastic element 5 is located against the touch portion 17 so that the elastic element 5 tends to pivot the handle 3 from the base 2.

A strap or belt is directed in the gap defined between the jaw 12 of the base 2 and the cam 14 of the handle 3 through the openings 8 and 9. The strap is clamped between the jaw 12 of the base 2 and the cam 14 of the handle 3.

The base 2 and the handle 3 are made of zinc-aluminum alloy in an extrusion process. A lot of material is used to form the base 2 and the handle 3. The base 2 and the handle 3 are thick and heavy. Furthermore, such zinc-aluminum alloy is soft so that the rigidity of both of the base 2 and the handle 3 is inadequate. Moreover, a lot of energy is consumed to heat and melt such zinc-aluminum alloy. In addition, it takes a long period of time for the base 2 and the handle 3 to cool down before they can be subject to finishing. Hence, the throughput is low. Furthermore, it costs a lot of money to develop molds for molding the base 2 and the handle 3.

Therefore, the present invention is intended to obviate or at least alleviate the problems encountered in the prior art.

SUMMARY OF INVENTION

According to the present invention, a buckle includes a base made by pressing and formed with two walls, a cross member between the walls and a jaw between the walls. A jaw is made by rolling and formed with a cam, two non-circular blocks extending from the cam and two shafts extending from the non-circular blocks into an aperture defined in each of the walls of the base. A handle is made by pressing and formed with a touch portion and two non-circular braces for holding the non-circular blocks of the jaw. A handle is installed on the base so that a gap is defined between the jaw of the base and the jaw of the handle. The handle can be pivoted on the base between a first position where the gap is small and a second position where the gap is large. An elastic element tends to keep the handle in the first position.

An advantage of the buckle according to the present invention is fast fabrication thereof.

Another advantage of the buckle according to the present invention is the use of a small amount of material.

Another advantage of the buckle according to the present invention is to provide a compact and light structure.

Another advantage of the buckle according to the present invention is firm clamping of the strap due to the use of the jaws biased by the elastic element.

Other advantages and features of the present invention will become apparent from the following description referring to the drawings.

BRIEF DESCRIPTION OF DRAWINGS

The present invention will be described through detailed illustration of two embodiments and a conventional buckle referring to the drawings.

DETAILED DESCRIPTION OF EMBODIMENTS

Figure 2:
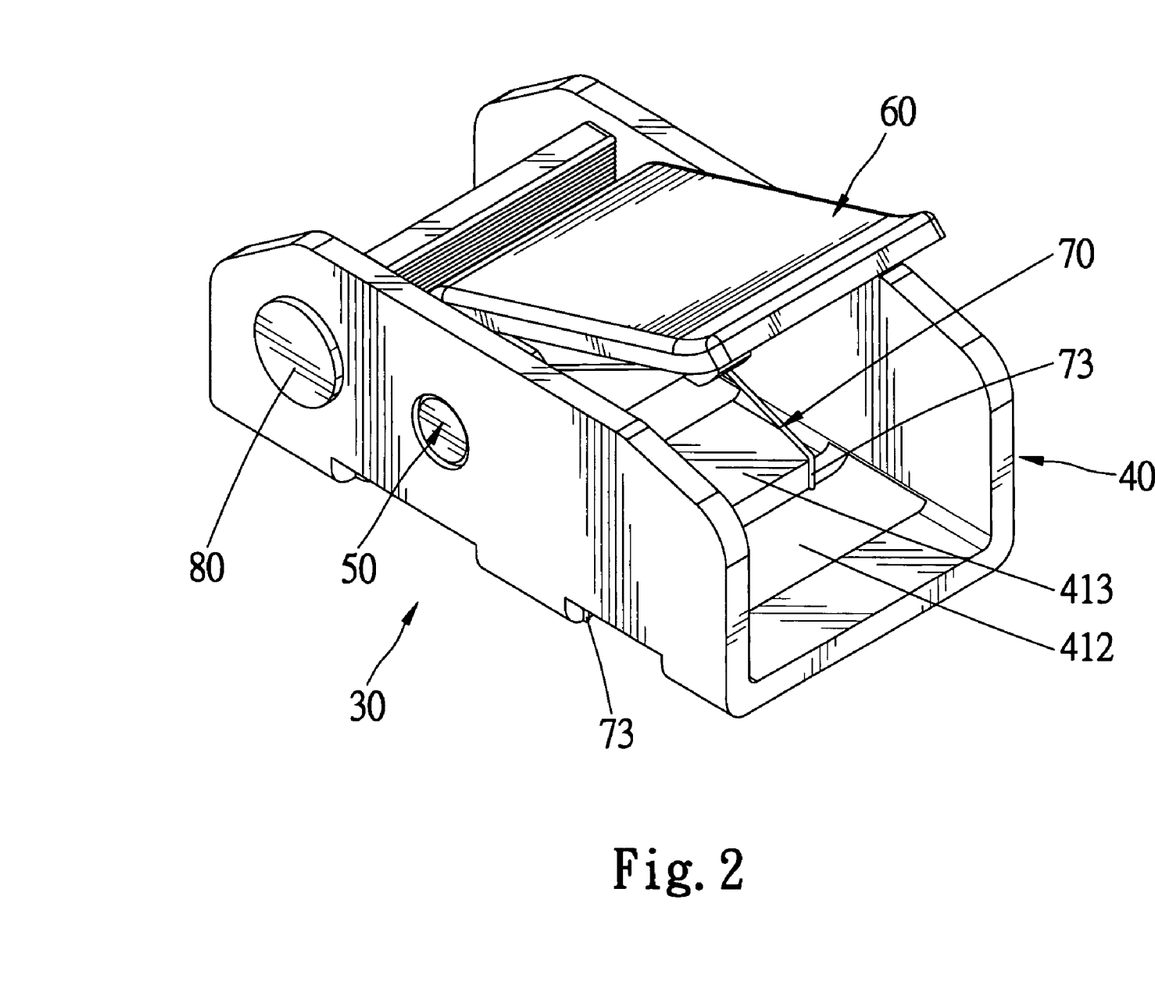
FIG. 2 is a perspective view of a buckle according to the first embodiment of the present invention.
Figure 3:
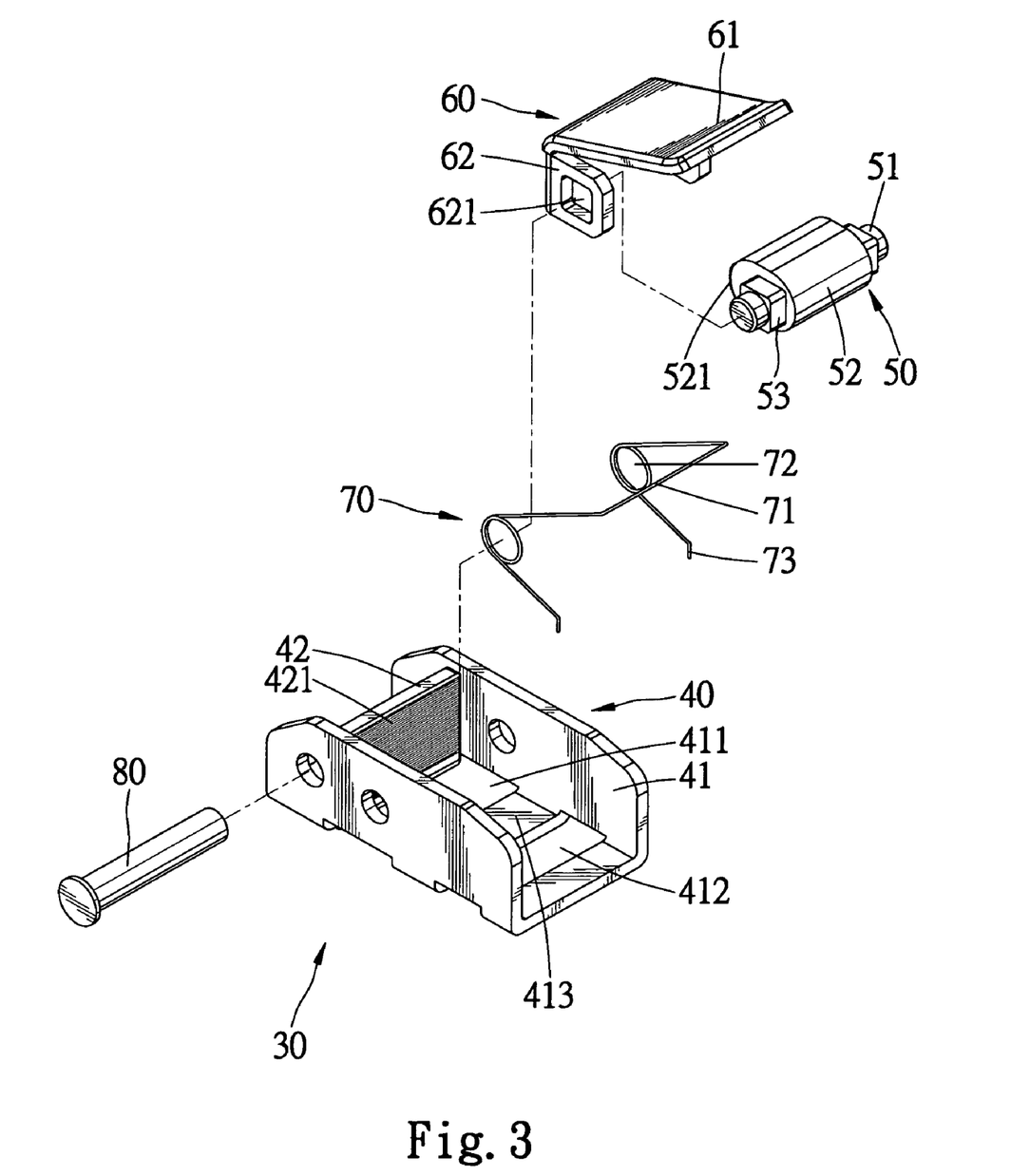
FIG. 3 is an exploded view of the buckle shown in FIG. 2.

FIGS. 2 and 3 shows a buckle 30 according to a first embodiment of the present invention. The buckle 30 includes a base 40, a jaw 50, a handle 60 and an elastic element 70. The base 40 and the handle 60 are made of iron in a continuous pressing or punching process with ease at a low cost. The jaw 50 is made of iron in a rolling process with ease at a low cost.

The base 40 is made of a first iron sheet including a middle portion and two lateral portions. In the continuous pressing process, the lateral portions of the first iron sheet are bent from the middle portion of the first iron sheet so that the former extend perpendicular to the latter. The lateral portions of the first iron sheet become walls 41 while the middle lateral portion of the same becomes a floor. Hence, the base 40 is U-shaped in an end-view.

The floor is punched so that a portion thereof is removed, leaving an opening 412 therein and that a portion 42 thereof is bent, leaving an opening 411 therein. The opening 411 is separated from the opening 412 by a cross member 413 extending between the walls 41. The portion 42 is perpendicular to the floor. The portion 42 can hereinafter be referred to as the "jaw 42." The jaw 42 is formed with teeth 421.

Figure 4:
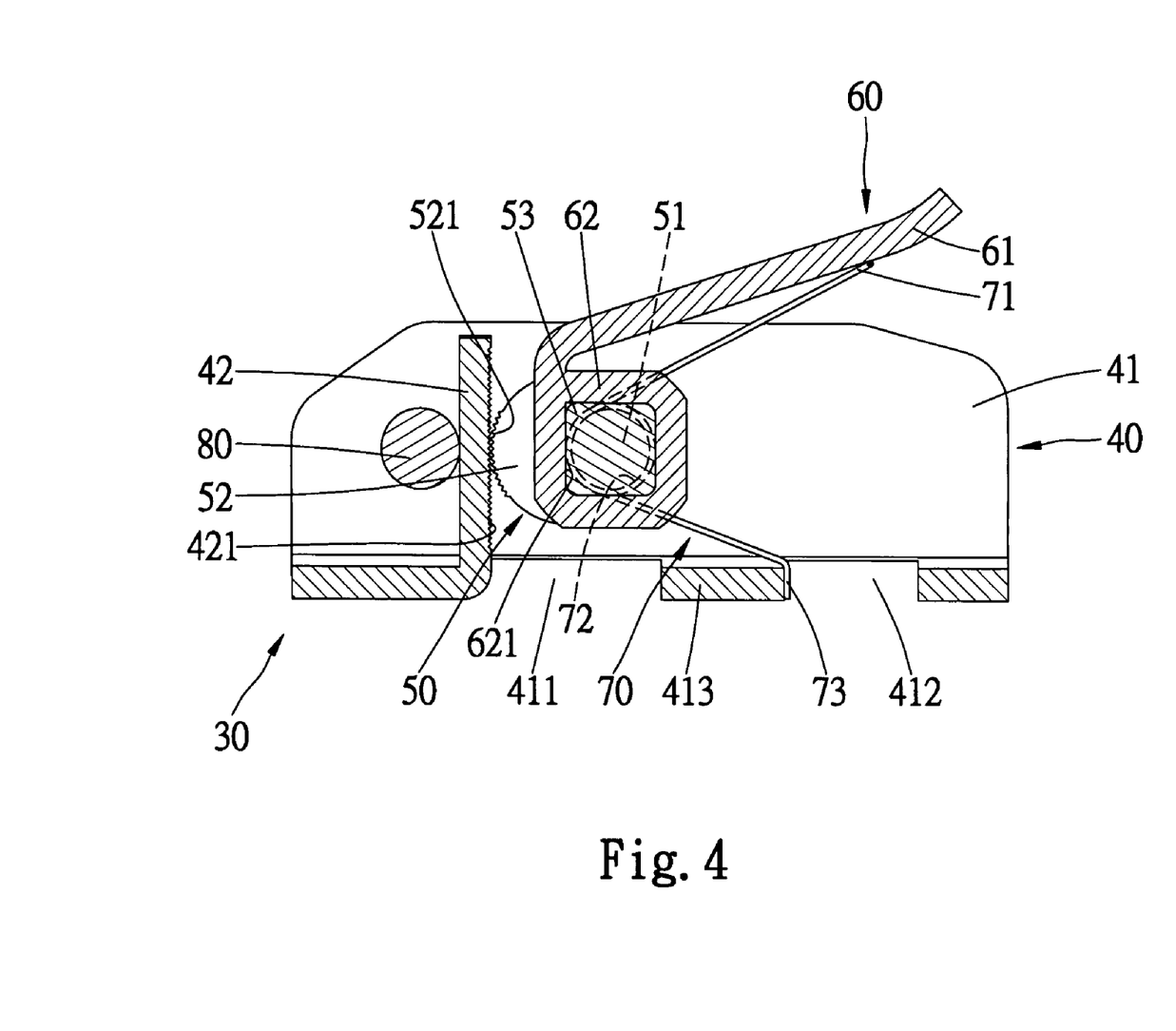
FIG. 4 is a cross-sectional view of the buckle shown in FIG. 2.
Figure 5:
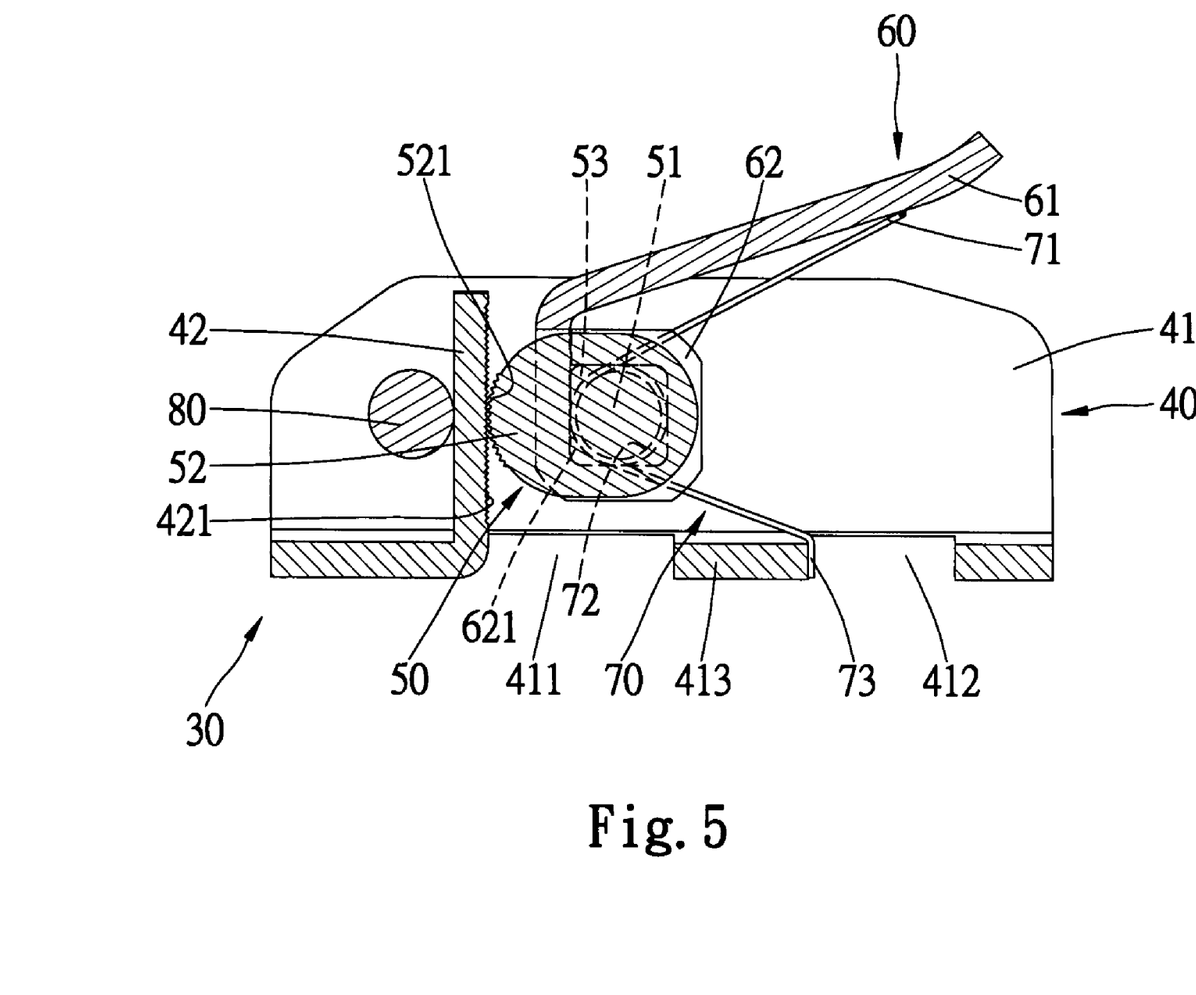
FIG. 5 is a cross-sectional view of the buckle in another position than shown in FIG. 4.
Figure 6:
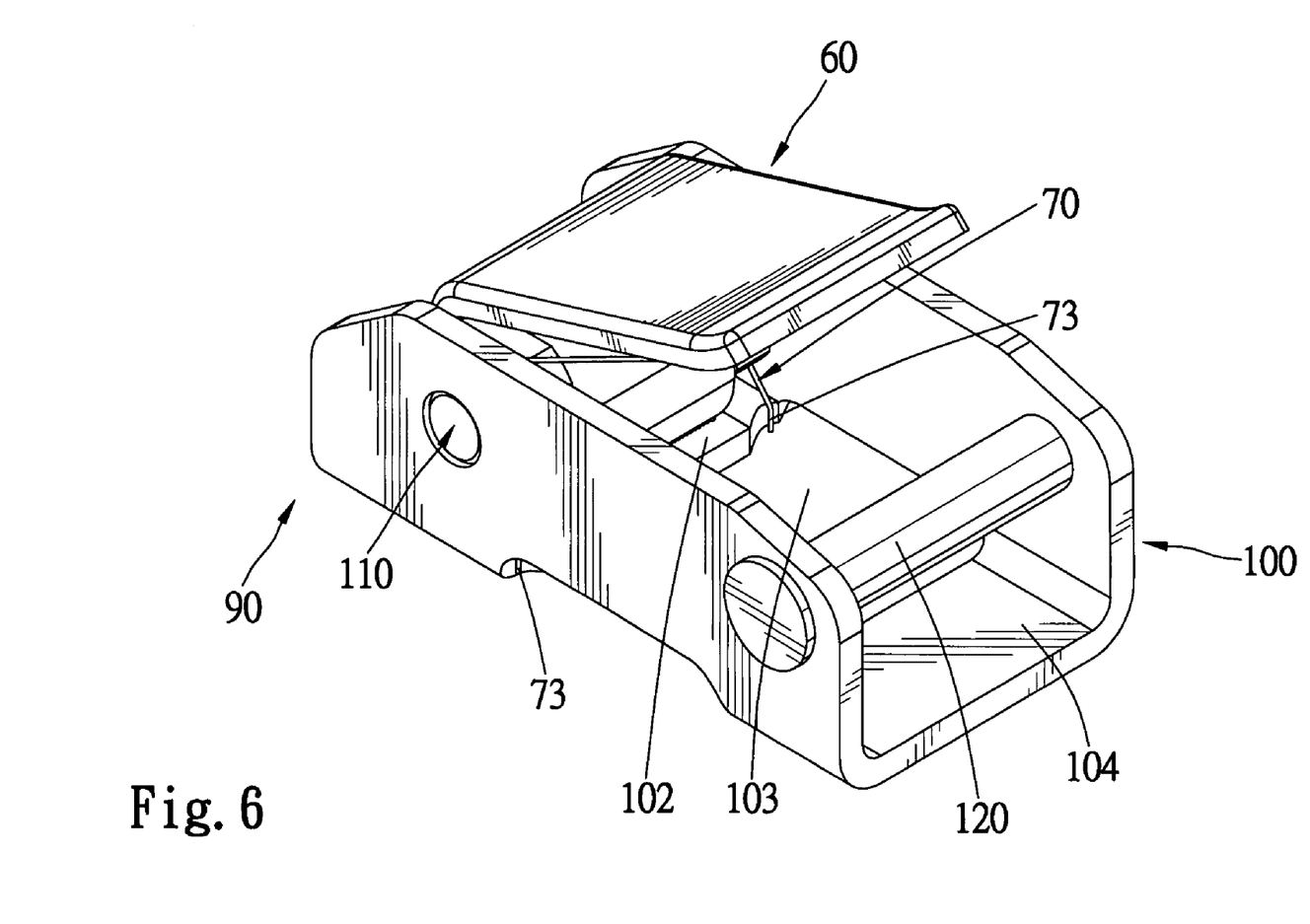
FIG. 6 is a perspective view of a buckle according to the second embodiment of the present invention.
Figure 7:
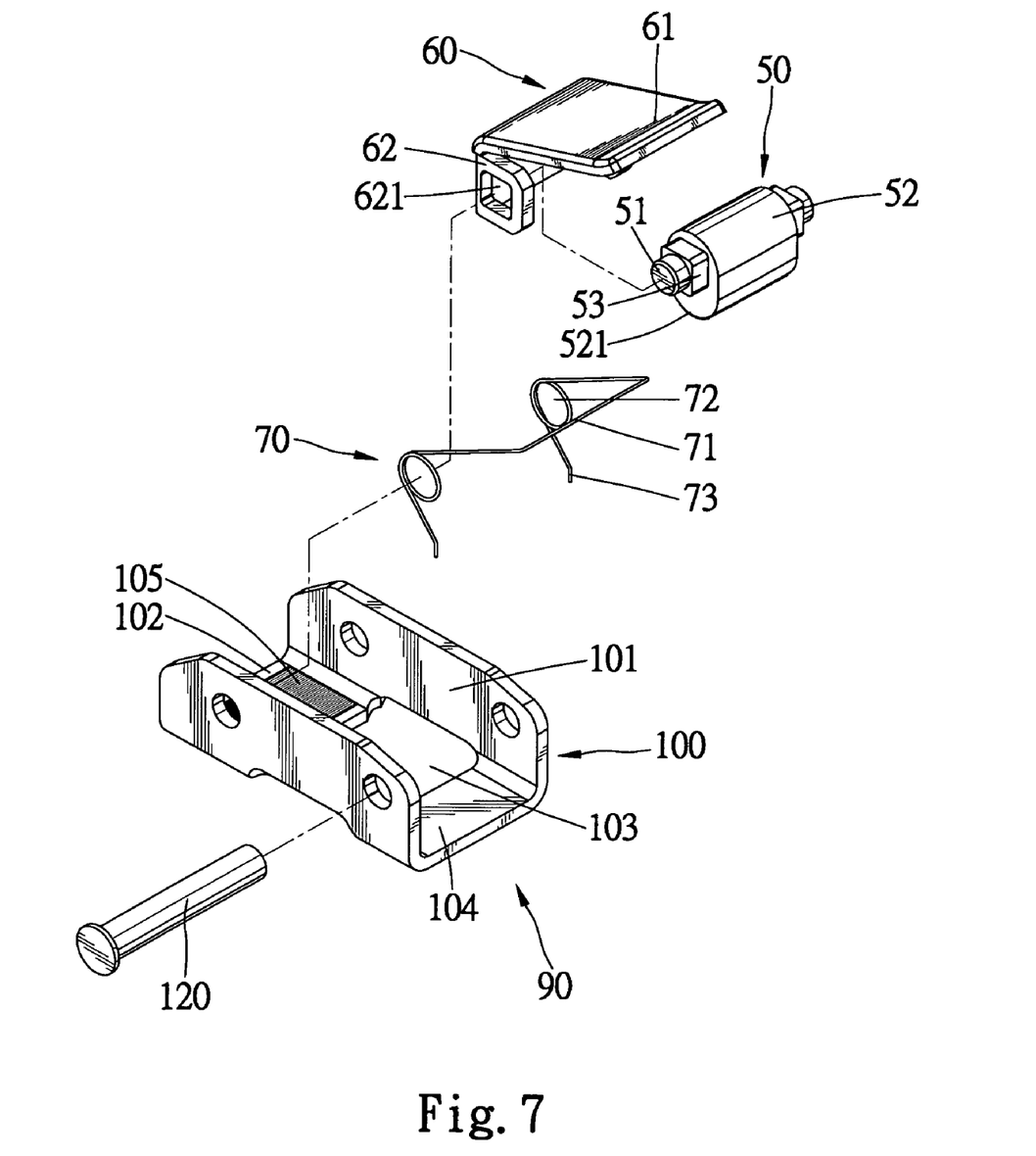
FIG. 7 is an exploded view of the buckle shown in FIG. 6.
Figure 8:
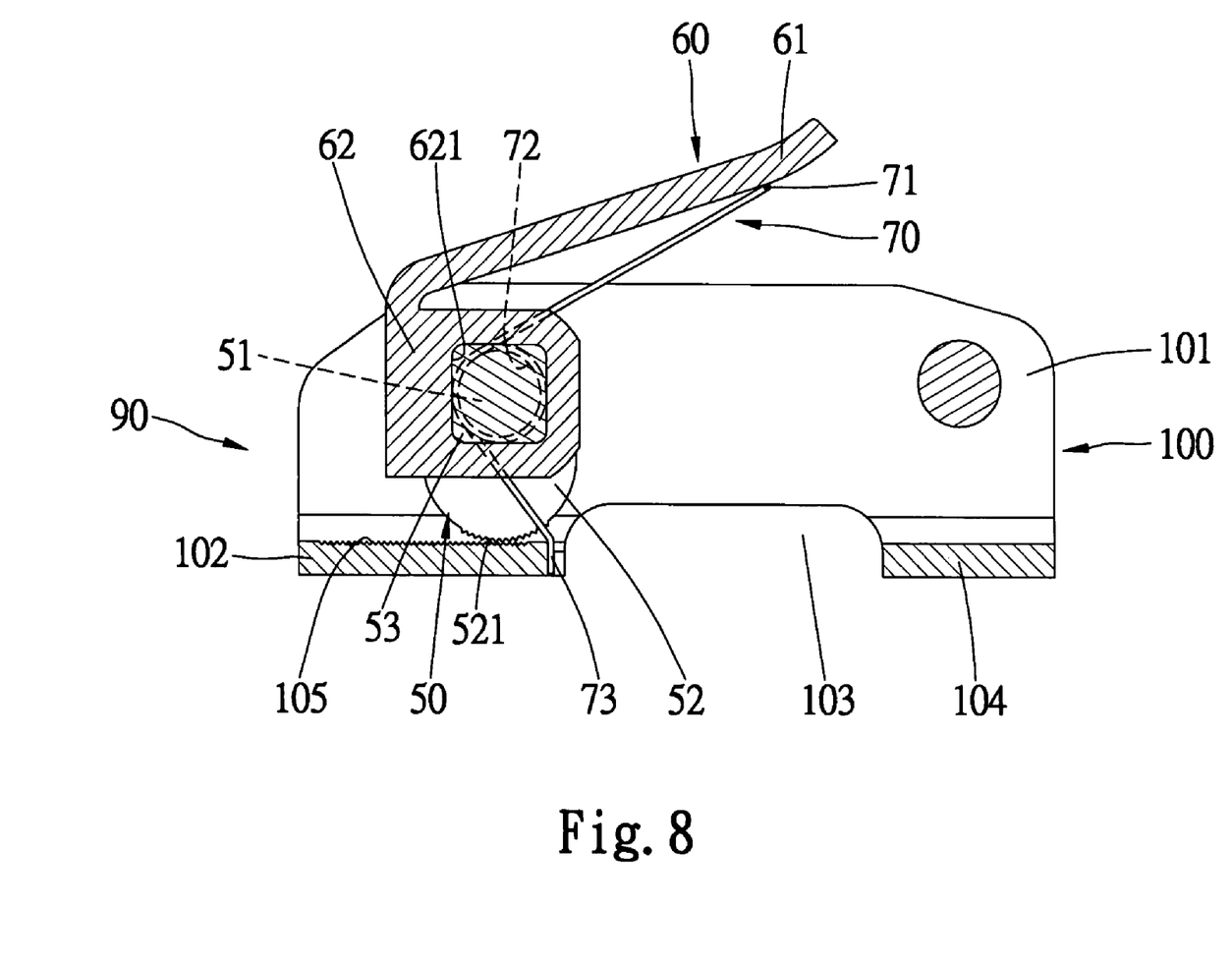
FIG. 8 is a cross-sectional view of the buckle shown in FIG. 6.
Figure 9:
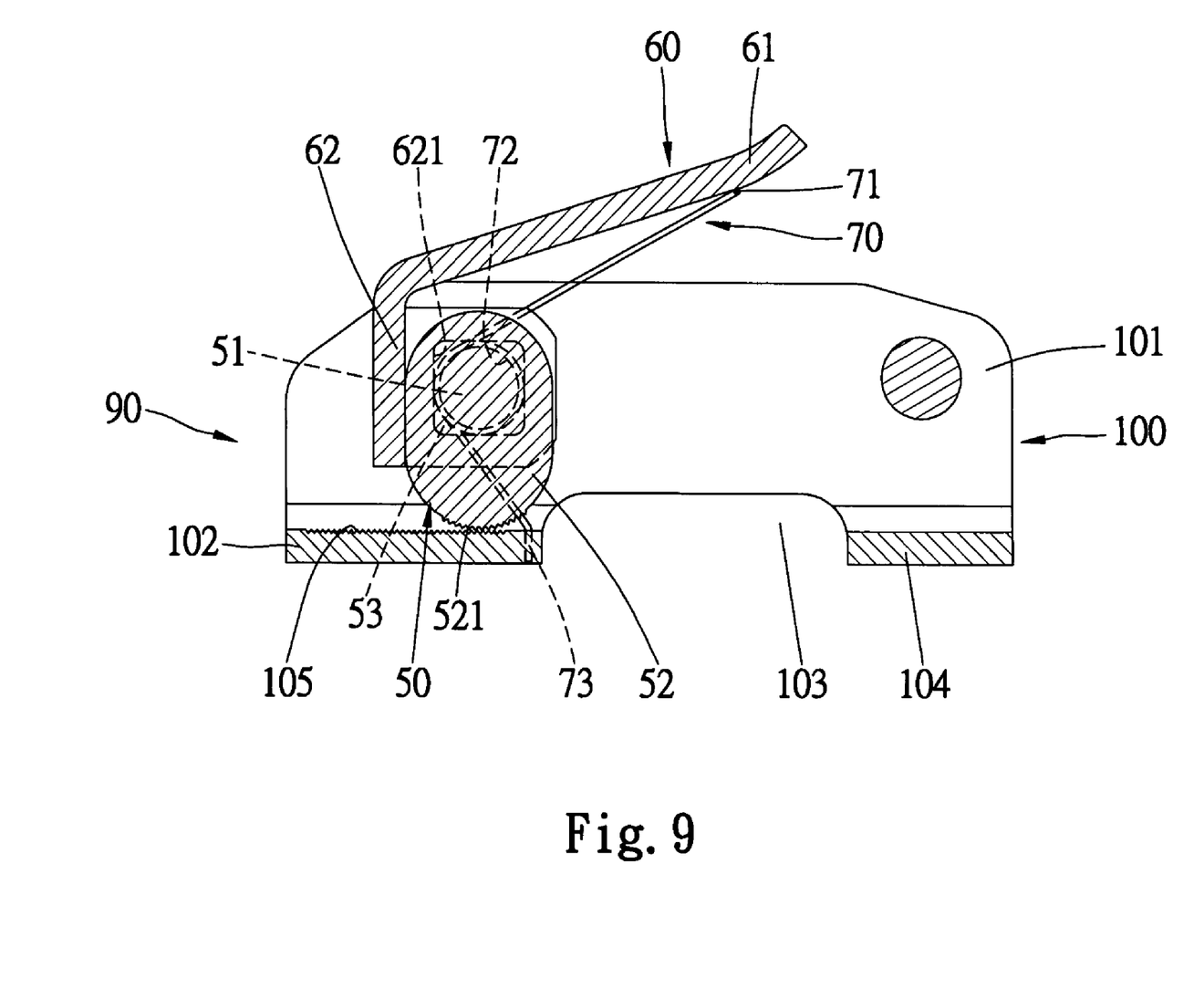
FIG. 9 is a cross-sectional view of the buckle in another position than shown in FIG. 8.

Referring to FIGS. 4 and 5, a bar 80 is inserted in an aperture defined in each of the walls 41. The bar 80 is used to support the jaw 42 for reinforcing the base 40.

The jaw 50 includes a cam 52, two square blocks 53 extending from the cam 52 and two shafts 51 extending from the square blocks 53. The cam 52 is formed with a plurality of teeth 521.

The handle 60 is made of a second iron sheet including a middle portion and two lateral portions. In the continuous pressing process, the lateral portions of the second iron sheet are bent from the middle portion of the second iron sheet so that the former extend perpendicular to the latter. The lateral portions of the second iron sheet become braces 62 while the middle portion of the same becomes a touch portion 61. Each of the braces 62 defines an aperture 621.

The square blocks 53 are fit in the apertures 621 of the braces 62 so that the jaw 50 is connected to the handle 60 and that the jaw 50 can be pivoted by operating the handle 60.

The elastic element 70 is made of an excellently elastic steel rod. The elastic element 70 includes a middle portion 71 and two lateral portions. Each of the lateral portions of the elastic element 70 includes a helical portion 72 and an end 73 extending from the helical portion 72. The end 73 of each of the lateral portions of the elastic element 70 may be in the form of a hook.

Each of the shafts 51 of the jaw 50 is inserted in an aperture defined in one of the walls 41 of the base 40 through one of the helical portions 72 of the elastic element 70 so that the base 40, the jaw 50, the handle 60 and the elastic element 70 are joined. There is a gap defined between the jaw 42 of the base 40 and the cam 52 of the jaw 50. The ends 73 of the elastic element 70 are located against the cross member 413 of the base 40 while the middle portion 71 of the elastic element 70 is located against the touch portion 61 of the handle 60 so that the elastic element 70 tends to pivot the handle 60 from the base 40.

Referring to FIG. 4, the gap between the cam 52 of the jaw 50 and the jaw 42 of the base 40 is small.

Referring to FIG. 5, a user pivots the handle 60 towards the base 40 by the touch portion 61 so that the gap between the cam 52 of the jaw 50 and the jaw 42 of the base 40 becomes large for receiving a strap or belt.

Because of the elastic element 70, the handle 60 and the jaw 50 will be turned back to the position shown in FIG. 4 from the position shown in FIG. 5 if the user releases the handle 60. The gap between the cam 52 of the jaw 50 and the jaw 42 of the base 40 becomes small again for restraining the strap.

Referring to FIGS. 6 through 9, there is shown a buckle 90 according to a second embodiment of the present invention. The buckle 90 includes a base 100, a jaw 50, a handle 60 and an elastic element 70. The base 100 and the handle 60 are made of iron in a continuous pressing or punching process.

The base 100 is made of an iron plate. The base 100 includes two walls 101, a cross member 104 extending between the walls 101, a jaw 102 extending between the walls 101 and an opening 103 for separating the cross member 104 from the jaw 102. The jaw 102 and the cross member 104 extend in a same plane. The jaw 102 is formed with a plurality of teeth 105. A rivet 120 is fit in an aperture defined in each of the walls 101 of the base 100 for reinforcing the base 100. Each shaft 51 of the jaw 50 is inserted in an aperture 110 defined in one of the walls 101 of the base 100 and through one of the helical portions 72 of the elastic element 70 so that the base 100, the jaw 50, the handle 60 and the elastic element 70 are joined.

The buckle 90 is otherwise like the buckle 30.

The buckle 90 according to the present invention exhibits several advantages. Firstly, its manufacturing is fast. Secondly, a small amount of material is used. Thirdly, it is compact and light. Fourthly, it is strong for using the bars. Fifthly, it firmly clamps the strap due to the use of the jaws biased by the elastic element 70.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A buckle comprising:
   a base made by pressing, with the base including two walls, a cross member between the two walls and a base jaw between the two walls;
   a handle jaw made by rolling, with the handle jaw including a cam, two non-circular blocks extending from the cam and a shaft extending from each of the two non-circular blocks into an aperture defined in each of the two walls of the base, with each of the two non-circular blocks intermediate to the cam and the shaft, with the two non-circular blocks having a perimeter, with the perimeter smaller than a circumference of the cam, with the perimeter larger than a circumference of the shaft, with the handle jaw located between the two walls;
   a handle made by pressing, with the handle including a touch portion and two non-circular braces extending from the touch portion for holding the two non-circular blocks of the handle jaw, with the two non-circular braces in contact with the two non-circular blocks of the handle jaw, wherein the handle is installed on the base so that a gap is defined between the base jaw and the handle jaw, wherein the handle can be pivoted on the base between a first position where the gap is small and a second position where the gap is large; and
   an elastic element biasing the handle from the first position to the second position.

2. The buckle according to claim 1 wherein the two non-circular blocks of the handle jaw are square, wherein the two non-circular braces of the handle are square.

3. The buckle according to claim 1 wherein the handle jaw is perpendicular to the cross member.

4. The buckle according to claim 3 further comprising a bar installed on the two walls of the base for supporting the base jaw.

5. The buckle according to claim 1 wherein the base jaw and the cross member of the base extend in a same plane.

6. The buckle according to claim 5 further comprising a rivet fit in the two walls of the base for reinforcing the base.

7. The buckle according to claim 1 wherein the elastic element provides torque between the base and the handle.

8. The buckle according to claim 7 wherein the elastic element comprises a helical portion, an end located against the base and another end located against the handle.

9. The buckle according to claim 8 wherein the shaft extending from one of the two non-circular blocks extending from the cam of the handle jaw is inserted through the helical portion of the elastic element.

10. The buckle according to claim 7 wherein the elastic element comprises two lateral portions each comprising a helical portion and an end located against the base and a middle portion formed between the two lateral portions and located against the handle.

* * * * *